United States Patent
Killion et al.

[11] 3,797,577
[45] Mar. 19, 1974

[54] TURF PERFORATING TOOL

[76] Inventors: Marvin L. Killion, 510 Pontiac Dr., Gretna, Nebr. 68028; Richard R. Williams, Ithaca, Nebr. 68033

[22] Filed: June 13, 1972

[21] Appl. No.: 262,330

[52] U.S. Cl. .................................... 172/22, 172/96
[51] Int. Cl. ............................................. A01b 45/02
[58] Field of Search ................. 172/21, 22, 96, 748; 111/91, 89; 56/249

[56] References Cited
UNITED STATES PATENTS

| | | | |
|---|---|---|---|
| 2,800,066 | 7/1957 | Cohrs et al. | 172/22 |
| 3,204,703 | 9/1965 | Hansen | 172/21 |
| 3,621,920 | 11/1971 | Brown | 172/21 |
| 2,193,779 | 3/1940 | Ramsden et al. | 172/21 |

*Primary Examiner*—Stephen C. Pellegrino
*Attorney, Agent, or Firm*—Henderson & Strom

[57] ABSTRACT

A turf perforating tool for use with conventional turf perforating equipment, the tool having a hinge plate secured to a reciprocating shaft, a hinge mechanism interconnecting the plate to a cap, and a cutting element having a core passage formed therein and threadably secured to the cap, wherein the cutting element is substantially vertically disposed during the core cutting process but will pivot slightly during the core removing process thus substantially preventing the compaction of soil around the hole formed by the tool.

10 Claims, 5 Drawing Figures

PATENTED MAR 19 1974   3,797,577

TURF PERFORATING TOOL

BACKGROUND

This invention relates to turf conditioning equipment, and more particularly to a tool for punching and removing turf cores for use in conjunction with mechanized turf perforating equipment.

The aeration of turf is widely practiced for the purpose of allowing air, water, and fertilizers to effectively penetrate the turf surface for absorption by the roots of the grass. The most efficient aeration is accomplished by the removal from the turf of small cores of turf material. By removing cores, instead of merely puncturing the surface with a solid tool, an even turf surface is maintained, and the soil surrounding the core holes is not unduly compacted.

Furthermore, if the turf is merely punctured with a solid tool, the compacted sides of the hole will tend to reseal the hole when the turf is dampened, necessitating a time consuming repetition of the puncturing process.

Several mechanized devices exist for the punching and removing of cores of turf. However, these devices use a vertical punching motion which, when employed with a constant transversing motion imparted by the forward motion of the device, tends to unduly compact the forward side of the hole, because the tool is moved forward while still imbedded in the turf. To alleviate this difficulty, highly complex mechanisms are employed to keep the punch horizontally stationary with respect to the turf during the perioif of the punching cycle, such as disclosed in U.S. Pat. No. 2,800,066.

In some instances the turf core is removed by the use of long tubular shaped tools. As each successive core is cut from the turf it must push a plurality of previously cut cores up the tool, a distance equal to the length of a core while ejecting the uppermost core from the tool. Frequently the friction of the plurality of cores within the tool causes a jamming of the cores, and a halting of the orderly upward progression of cores; this disadvantageous jamming necessitates a time consuming removal of the jammed cores from the tool or instead of coring the tool acts as a solid punch and merely compacts the soil. In addition, if the core is carried upward through a long tool, it is ejected from the tool near the mechanism of the turf perforating equipment and constitutes an abrasive contaminant, injurious to the mechanism.

SUMMARY

The turf perforating tool of this invention is comprised of a generally cylindrical cutting element having on the bottom thereof an external circumferential bevel which intersects an axial bore forming an annular cutting edge. The axial bore extends vertically upwardly, then inclinedly toward the rear whereupon it exits on the trailing side of the cutting element. The cutting element is threadably mounted in a cap that is hingedly connected to a plunger that allows only limited pivotal action of the cap and cutting element.

It is therefore an object of this invention to provide a turf perforating tool that may be pivoted slightly during the period of the punching cycle when the punch is imbedded in the turf without unduly compacting the soil at the forward side of the hole, or producing an uneven surface.

Another object of this invention is the provision of an inexpensive tool that will alleviate the need for the complex and expensive machinery presently necessary to keep the perforating tool of turf perforating equipment horizontally fixed during the downward or punching portion of the punching cycle yet permitting it to pivot slightly as it is retracted from the turf.

It is a further object of the invention to provide a turf perforating tool which effeciently removes turf cores from the holes punched in the turf.

An additional object of the invention is to provide a turf perforating tool which may be easily removed and replaced in the event that the tool should become damaged.

Yet another object of the invention is to provide a turf perforating tool which is less succeptible to jamming of the cores within the tool.

Still another object of this invention is the provision of a turf perforating tool which ejects the cores, removed from the turf, close to the surface of the ground and away from the mechanism of the turf perforating equipment. Thus substantially reducing the possibility of having foreign material contaminating or affecting the mechanism.

Still another object of this invention is the provision of an effective turf perforating tool that is simple in construction and operation and extremely economical to manufacture.

The objects and other features and advantages become more readily apparent upon reference to the following description when taken in conjunction with the appended drawings.

BRIEF DESCRIPTION OF THE DRAWINGS

In the drawings, although various modifications and alternate constructions can be made thereto without departing from the true spirit of the invention, a preferred embodiment of the invention is illustrated, wherein.

DETAILED DESCRIPTION OF THE PREFERRED EMBODIMENT

Figure 1:
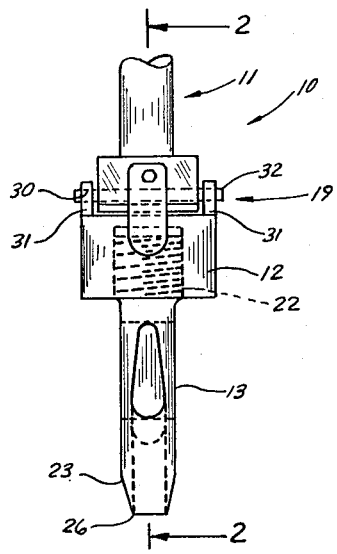
FIG. 1 is a side elevational view of the turf perforating tool of this invention.
Figure 2:
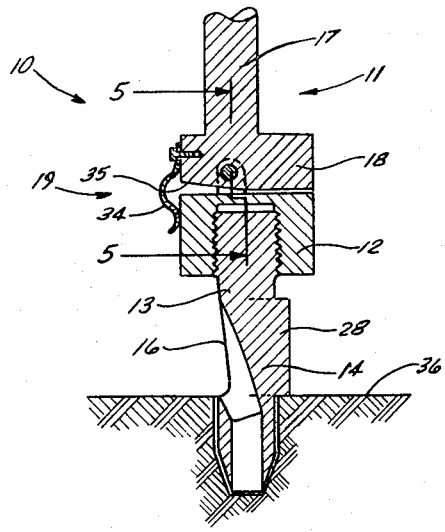
FIG. 2 is a sectional view of the tool as taken along the lines 2—2 in FIG. 1 and when imbedded in the turf.

Turning now to FIGS. 1 and 2 of the drawings, there is shown therein a typical turf perforating application in which the perforating tool, generally designated at 10, of this invention is employed. The perforating tool comprises a plunger 11 hingedly connected to a cap 12, and a cutting element 13 threadably disposed on the cap. A leading side 14 of the tool faces the direction of travel of the turf perforating equipment (not shown) and a trailing side 16 of the tool is opposite from the leading side 14 of the tool.

The plunger 11 (FIGS. 1 and 3) comprises a shaft 17 vertically disposed and vertically moveable, which is affixable at its top end to a reciprocating punching mechanism (not shown) of the mechanized turf perforating equipment (not shown). Affixed to and extending perpendicularly from the shaft at its lower end is a hinge plate 18. It will be noted, that the hinge plate 18 is positioned slightly toward the trailing side 16 of the perforating tool 10 from the axis of the shaft 17. Interconnected between the plate 18 and the cap 12 is a hinge mechanism 19. The cap 12 is generally cylindrical in shape and has a tapped opening 22 formed therein from the underside thereof.

The cutting element 13 (FIG. 3), threadably disposed in the tapped opening 22 at its upper end and depending therefrom, is generally cylindrical in shape and has an external circumferential bevel 23 formed on the circumference of the lower portion thereof. An axial bore 24 extends upwardly from the lower end of the cutting element 13 a distance approximately equivalent to one third of the length of the cutting element 13, thence it is inclined upwardly toward the trailing side 16 of the cutting element 13. The inclined portion of the bore 24 exits from the cutting element 13 on the trailing side 16 thereof.

The intersection of the circumferential bevel 23 (FIG. 3) and the bore 24, on the lower edge of the cutting element 13, provides a circular cutting edge 26 for cutting of turf cores 27.

Figure 4:
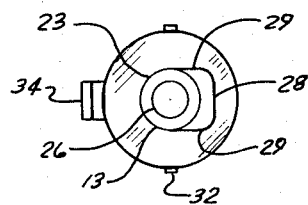
FIG. 4 is a bottom plan view of the tool.

Referring to FIGS. 2 and 4, a generally U shaped boss 28 is shown protruding from the leading side 14 of the cutting element 13 and is integral therewith. The boss 28 extends vertically on the leading side 14 of the cutting element 13 substantially opposite from the exit opening of the bore 24. The boss 28 is primarily intended to reinforce the sidewalls of the cutting element 13 adjacent the bore 24 exit while its two vertically disposed parallel sides 29 accomplish the secondary purpose of providing wrenching flats for threadably tightening or loosening the cutting element 13 to or from the cap 12.

Figure 5:
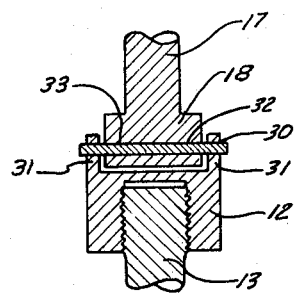
FIG. 5 is an offset, partial sectional view taken along the lines 5—5 in FIG. 2.

The hinge mechanism 19 (FIGS. 1 and 5) includes a pair of spaced tabs 31 which project upwardly from the upper surface of the cap 12 and are disposed slightly rearwardly from the middle of the cap (FIG. 2). The tabs 31 (FIG. 5) have co-axial, horizontal, holes 30 drilled therein for receiving a hinge pin 32 therethrough and through a co-axial hole 33 formed through the hinge plate 18. The trailing portion 35 (FIG. 2) of the underside of the plate 18 is beveled slightly between the trailing edge and the co-axial hole 33, thus permitting limited rotation or pivotal action of the cap 12 with respect to the plate. A bracing unit, for example a leaf spring 34, is affixed to the trailing side of the hinge plate 18 and extends downwardly to coact with the cap 12 thus urging the cap 12 and cutting element 13 into coaxial alignment with the shaft 17.

The utilization of the leaf spring 34, and beveled hinge plate 18 to provide limited rotation of the cap 12 and cutting element 12 is not exclusive, and it is understood that a variety of alternate configurations may be employed to accomplish the stated purpose.

Figure 3:
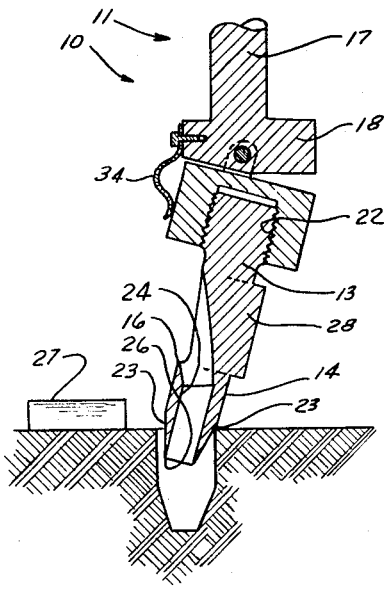
FIG. 3 is a sectional view of the tool, similar to FIG. 2, just as the tool is removed from the turf but before the spring reacts to move the cutting tool into a vertical, normal, position.

Referring to FIGS. 2 and 3, the operation of the invention proceeds as follows: The mechanized turf perforating mechanism (not shown) imparts a downward acceleration to the shaft 17 in excess of the acceleration of gravity. The acceleration is likewise imparted to the cap 12 and cutting element 13 and suppliments the force of the spring 34 thus causing the cap 12 and cutting element 13 to assume a vertical position. The cutting element 13 is then forced into the turf 36 causing the cutting edge to cut a cylindrical core 27 from the turf. As the core 27 is cut, it is forced into the vertical bore 24 of the cutting element 13 by the resisting force of the turf. When the core 27 is forced into the vertical bore 24, it pushes a previously cut core 27, or cores, upward into the inclined bore, and expells a previously cut core 27 at the completion of the downward travel of the cutting element 13. The shaft 17 and hinge plate 18 are continuously moving in the transverse direction as imparted by the forward motion of the equipment thus causing the cutting element 13 and cap 12 to pivot about the hinge mechanism 19. Any lateral force on the cutting element 13 causes it to pivot thus substantially eliminating any undue compaction of the turf at the forward side of the hole.

As is evident from the above discussion, this invention has provided an inexpensive tool that alleviates the need for the complex and expensive machinery previously necessary to prevent undue compaction of the forward side of the holes cut in the turf.

The turf cores are efficiently expelled from the short cutting element. Fewer cores are continuously retained within the cutting element thus lessening the friction forces on the cores and lessening the possibility of jamming of the cores. In the event that a jam should nonetheless occur, fewer cores are involved and removal of the jammed cores is subsequently easier.

The wrenching flats 29 provide an efficient and convenient means of removing and replacing the cutting element 13 should it become damaged, thus eliminating the extensive disassembly time necessary with previously existing tools.

We claim:

1. A turf perforating tool for use with said substantially vertically disposed reciprocating member of turf perforating equipment, a turf perforating tool comprising:
   a substantially vertically disposed shaft means secured to the reciprocating member and depending from the member;
   a hinge mechanism operably secured to said shaft means;
   a cap secured to said hinge mechanism; and
   a cutting element secured to and depending from said cap wherein said element has a bore filled therein which extends axially from the bottom thereof a short distance and then is inclined to exit from said element rearwall below said cap.

2. A turf perforating tool as defined in claim 1, wherein said shaft means includes a shaft secured on its upper end to the member and having a hinge plate secured to its lower end, said hinge mechanism operably secured to said hinge plate.

3. A turf perforating tool as defined in claim 1, wherein said element is cylindrical in shape and has an external circumferential bevel formed on the lower portion thereof thus forming a circular cutting edge on the bottom of said element.

4. A turf perforating tool as defined in claim 1 wherein said hinge mechanism is secured to said shaft means at said shaft means longitudinal axis.

5. A turf perforating tool as defined in claim 3 wherein a boss is secured to said element opposite said bore exit, said boss extending vertically the length of said bore exit and having parallel sidewalls projecting outwardly of said element.

6. A turf perforating tool as defined in claim 4, and including a spring means operably connected to said cap for biasing said element into a vertical position.

7. A turf perforating tool as defined in claim 2, wherein said hinge mechanism includes a pair of spaced tabs secured to said cap and projecting toward said plate, said tabs and said plate having aligned holes formed therethrough; and a hinge pin disposed in said holes for hingedly connecting said plate and said cap together.

8. A turf perforating tool as defined in claim 7, wherein said plate lower surface is beveled from said plate hole to one side thereof and acts as a stop to limit the pivotal action of said cap relative to said plate.

9. A turf perforating tool as defined in claim 8, wherein said element has a bore formed therein which extends axially from the bottom thereof a short distance and then is inclined to exit from said element rearwall below said cap, said element is cylindrical in shape and has an external circumferential bevel formed on its lower portion thus forming a circular cutting edge on the bottom thereof, and a boss is secured to said element opposite said bore exit, said boss extending vertically the length of said bore exit and having parallel sidewalls projecting outwardly of said element.

10. A turf perforating tool as defined in claim 9, wherein said element is detachably secured to said cap.

* * * * *